(12) United States Patent
Sommacal

(10) Patent No.: US 8,495,954 B2
(45) Date of Patent: Jul. 30, 2013

(54) EQUIPMENT FOR ROASTING COFFEE BEANS AND EDIBLE SEEDS IN GENERAL

(76) Inventor: Alessandro Sommacal, Padua (IT)

( * ) Notice: Subject to any disclaimer, the term of this patent is extended or adjusted under 35 U.S.C. 154(b) by 411 days.

(21) Appl. No.: 12/429,208

(22) Filed: Apr. 24, 2009

(65) Prior Publication Data

US 2010/0101433 A1    Apr. 29, 2010

(30) Foreign Application Priority Data

Oct. 24, 2008   (IT) ............... PD2008A0306

(51) Int. Cl.
*A23B 4/03* (2006.01)
*A23B 4/044* (2006.01)
*B60H 3/00* (2006.01)

(52) U.S. Cl.
USPC ............ 99/476; 99/478; 99/479; 99/483; 99/471; 34/181

(58) Field of Classification Search
USPC .......... 99/474–479, 466–467, 355, 483, 99/470–471, 286, 424, 427; 34/181, 82, 85
IPC .................. A23L 1/18; A23B 4/03
See application file for complete search history.

(56) References Cited

U.S. PATENT DOCUMENTS

| | | | | |
|---|---|---|---|---|
| 27,887 A * | 4/1860 | Adams | ............ | 426/259 |
| 119,959 A * | 10/1871 | Ashcroft | ............ | 99/355 |
| 1,086,843 A * | 2/1914 | Nissinen | ............ | 432/45 |
| 1,224,620 A | 5/1917 | Ezzo | | |
| 1,468,419 A * | 9/1923 | Seymour | ............ | 99/469 |
| 1,742,978 A * | 1/1930 | Weathersby | ............ | 432/61 |
| 1,820,938 A * | 9/1931 | Clandrow | ............ | 99/345 |
| 2,172,603 A * | 9/1939 | Adams | ............ | 99/469 |
| 2,220,749 A * | 11/1940 | Adams | ............ | 34/435 |
| 2,301,922 A * | 11/1942 | Atti | ............ | 99/355 |
| 2,325,684 A * | 7/1943 | Kayden | ............ | 99/286 |
| 2,360,838 A * | 10/1944 | Atti | ............ | 99/468 |
| 2,639,133 A * | 5/1953 | Clary | ............ | 432/113 |
| 2,716,936 A * | 9/1955 | Kopf | ............ | 99/355 |
| 2,762,289 A * | 9/1956 | Crutcher, Jr. | ............ | 99/355 |
| 3,329,506 A * | 7/1967 | Smith, Jr. | ............ | 426/467 |
| 3,572,235 A * | 3/1971 | Nutting | ............ | 99/470 |
| 3,718,322 A * | 2/1973 | Skelton | ............ | 432/45 |
| 3,964,175 A | 6/1976 | Sivetz | | |
| 4,271,603 A | 6/1981 | Moore | | |
| 4,425,720 A | 1/1984 | Elevitch | | |
| 4,494,314 A | 1/1985 | Gell, Jr. | | |
| 4,631,838 A * | 12/1986 | Eichler et al. | ............ | 34/665 |
| 4,642,906 A * | 2/1987 | Kaatze et al. | ............ | 34/393 |
| 4,683,666 A * | 8/1987 | Igusa et al. | ............ | 34/67 |
| 4,737,376 A | 4/1988 | Brandlein et al. | | |
| 4,871,901 A * | 10/1989 | Igusa et al. | ............ | 219/400 |
| 4,875,904 A | 10/1989 | Munk | | |

(Continued)

*Primary Examiner* — Gene Kim
*Assistant Examiner* — Matthew B Stanczak
(74) *Attorney, Agent, or Firm* — Themis Law

(57) ABSTRACT

In one embodiment, a piece of equipment for roasting edible seeds like coffee beans and the like includes a body sized to contain the product to be roasted, an air intake fan for conveying an air flow into the containing body, and a heater for heating the air flow. The containing body is fixed and houses a rotary shaft provided with one or more substantially radial arms or blades suited to stir the product during roasting, and may include a rotary drum that is integral or that may not be integral with the arms during rotation.

14 Claims, 4 Drawing Sheets

U.S. PATENT DOCUMENTS

| | | | |
|---|---|---|---|
| 4,924,765 A * | 5/1990 | Pera | 99/348 |
| 5,050,490 A | 9/1991 | Yahav et al. | |
| 5,269,072 A | 12/1993 | Waligorski | |
| 5,287,633 A * | 2/1994 | Sachs | 34/392 |
| 5,359,788 A | 11/1994 | Gell | |
| 5,386,764 A * | 2/1995 | Ratajczek | 99/483 |
| 5,500,231 A | 3/1996 | Gell, Jr. et al. | |
| 5,632,098 A | 5/1997 | Finch | |
| 5,638,607 A | 6/1997 | Lemme et al. | |
| 5,749,288 A | 5/1998 | Skaling | |
| 5,890,418 A | 4/1999 | Song | |
| 5,928,697 A * | 7/1999 | Argiles Felip | 426/466 |
| 5,960,561 A | 10/1999 | Parodi et al. | |
| 5,974,957 A * | 11/1999 | Ysen | 99/427 |
| 5,996,480 A | 12/1999 | Kelley et al. | |
| 6,036,988 A * | 3/2000 | Lemme et al. | 426/466 |
| 6,090,423 A * | 7/2000 | Wetzel | 426/233 |
| 6,123,971 A | 9/2000 | Tidland | |
| 6,250,207 B1 * | 6/2001 | Hansen | 99/286 |
| 6,382,087 B1 * | 5/2002 | Iiyama | 99/355 |
| 6,499,391 B1 * | 12/2002 | Su | 99/341 |
| 6,679,163 B1 * | 1/2004 | Su | 99/341 |
| 7,143,686 B1 * | 12/2006 | Sandolo | 99/286 |
| 7,235,764 B2 | 6/2007 | Poss | |
| 7,360,481 B2 | 4/2008 | Moon et al. | |
| 8,201,492 B2 * | 6/2012 | Cretors | 99/323.9 |
| 2005/0072018 A1 | 4/2005 | Behm | |
| 2008/0089986 A1 | 4/2008 | Song | |
| 2008/0134907 A1 * | 6/2008 | Iiyama | 99/467 |

* cited by examiner

EQUIPMENT FOR ROASTING COFFEE BEANS AND EDIBLE SEEDS IN GENERAL

FIELD OF THE INVENTION

The present invention concerns equipment for roasting edible seeds like coffee beans, nuts, peanuts and the like. More particularly, the present invention concerns a piece of equipment for domestic use that is suitable for roasting edible seeds such as coffee beans.

BACKGROUND OF THE INVENTION

It is known that some types of vegetable seeds must be subjected to suitable preliminary treatments to make them edible or usable for cooking purposes.

Coffee, for example, is harvested in green beans that are first subjected to a roasting treatment, during which they are dried at a high temperature by means of a flow of hot air that is intended to cook them and at the same time to remove the skin covering the beans.

The roasted coffee beans are then suitably ground and reduced to powder, so that they can be used for preparing coffee-based products and beverages.

Industrial machines for roasting and grinding coffee also are known, and are an integral part of coffee roasting systems having very high hourly outputs.

In particular, such industrial machines for roasting coffee generally comprise a substantially cylindrical fixed case that houses a drum rotating around a horizontal axis and that is provided with an opening for introducing the product to be roasted and an additional opening for unloading the roasted product.

In the known equipment, the roasting process is carried out by means of a flow of hot air that passes through the drum from the bottom toward the top, thus exploiting the natural motion of hot air, or that is forced to pass through said drum in an axial direction or from the top toward the bottom.

Other machines for roasting coffee used in bars and restaurants also are known, and have reduced dimensions compared to industrial machines and a capacity of at least 2-5 kg. The operation of these machines is substantially similar to that of the industrial machines.

Retail stores sell packages of roasted and ground coffee, and also packages of whole roasted coffee beans.

The whole beans product obviously costs less than the ground product, but the final consumer must then grind the coffee beans before consumption.

To this end, home coffee grinders are known and widely used, and typically consist of small manual or automatic machines that, by means of blades, grind the coffee beans to the size desired by the consumer according to the intended use of the product.

On the other hand, the retail sale of green coffee beans, that is, non-roasted beans, is not common, since the roasting equipment currently known is not suitable or efficient for domestic use, that is, for processing small quantities of coffee beans.

In fact, if the quantity of coffee beans to be treated is much lower than the capacity of the equipment, energy consumption is very high compared to the hourly output, and the quality of the roasting process also suffers, since the beans may become roasted excessively and be nusable for consumption.

Therefore, individual consumers have no incentive to buy unroasted coffee beans, which would allow them to save more than 80% on the cost of the raw material, because retail consumers have no available equipment that is suitable for roasting the beans efficiently.

SUMMARY OF THE INVENTION

To overcome the drawbacks of the prior art, a new type of domestic equipment for roasting coffee beans and semi-edible seeds in general has been studied and constructed.

The main object of the present invention is to provide a piece of equipment suitable for domestic use, that is, capable of roasting small quantities of coffee at a time, for example 0.5-2 kg of coffee, while reducing energy costs and providing a high-quality roasting process.

Another object of the present invention is to provide a piece of equipment that can be used independently of any other preceding or successive production processes.

A further object of the present invention is to limit the spreading of bad smells or dusts to the outside, which in one embodiment is achieved by filtering the hot air resulting from the roasting process that is rich in humidity and dust, and also by providing for the collection of roasting residues, that is, of the carbonized or burnt fragments of roasted bean skins.

These and other direct and complementary objects have been achieved by domestic equipment for roasting coffee beans or, more generally, semi-edible beans according to the present invention. In one embodiment, the equipment includes a fixed body sized to contain the product to be roasted, an opening for introducing the product to be processed, an additional opening for discharging the roasted product, and a device for stirring the product contained in the containing body. The stirring device includes one or more rotary arms or blades suited to mix the product during roasting, and, if necessary to move it toward the discharge opening.

An embodiment of the invention also includes at least one air suction fan, suited to convey an air flow into the containing body through a delivery duct; at least one resistance or heater suited to heat said air flow before the air flow is introduced into the containing body; and one or more chambers and/or devices for discharging and/or filtering the air that flows out of the containing body, such to filter the flow and hold the dust.

In the preferred embodiment of the invention that is described hereinbelow, the containing body is preferably a hollow cylindrical body, arranged with a substantially horizontal or slightly inclined longitudinal axis, and the duct for conveying the hot air flow is connected to the cylindrical side wall of the hollow cylinder in a preferably lateral position, so that the air flow enters the cylinder in a direction that is substantially horizontal and orthogonal to the longitudinal axis of the cylinder, and is successively distributed inside the cylinder itself.

Furthermore, in an embodiment of the invention, there is/are provided on the side wall of the cylinder t one or more holes or openings for letting the air out, preferably arranged in a position substantially opposite the inlet of the delivery duct and/or on the lower part of the cylinder, such that these holes or openings place the inside of said cylinder in communication with the inside of the discharging and filtering chamber.

Thus, the hot air flow passes through the cylinder substantially crosswise to the longitudinal axis of the cylinder, drying and roasting the product contained therein, and then the air flows out of the cylinder through the holes or openings, enters the discharge chamber and/or filtering devices and finally reaches the external environment.

In another embodiment of the invention, the equipment may also include a hollow cylindrical drum, housed in the containing cylinder and substantially coaxial with it, which is suited to contain the coffee beans to be roasted and which rotates in relation to the containing cylinder, integrally or not with the rotary stirring arms or blades.

BRIEF DESCRIPTION OF THE DRAWINGS

Features of the invention will be illustrated in greater detail in the following description, with reference to the drawings attached hereto that depict non-limiting embodiments.

DETAILED DESCRIPTION OF EMBODIMENTS OF THE INVENTION

Figure 1:
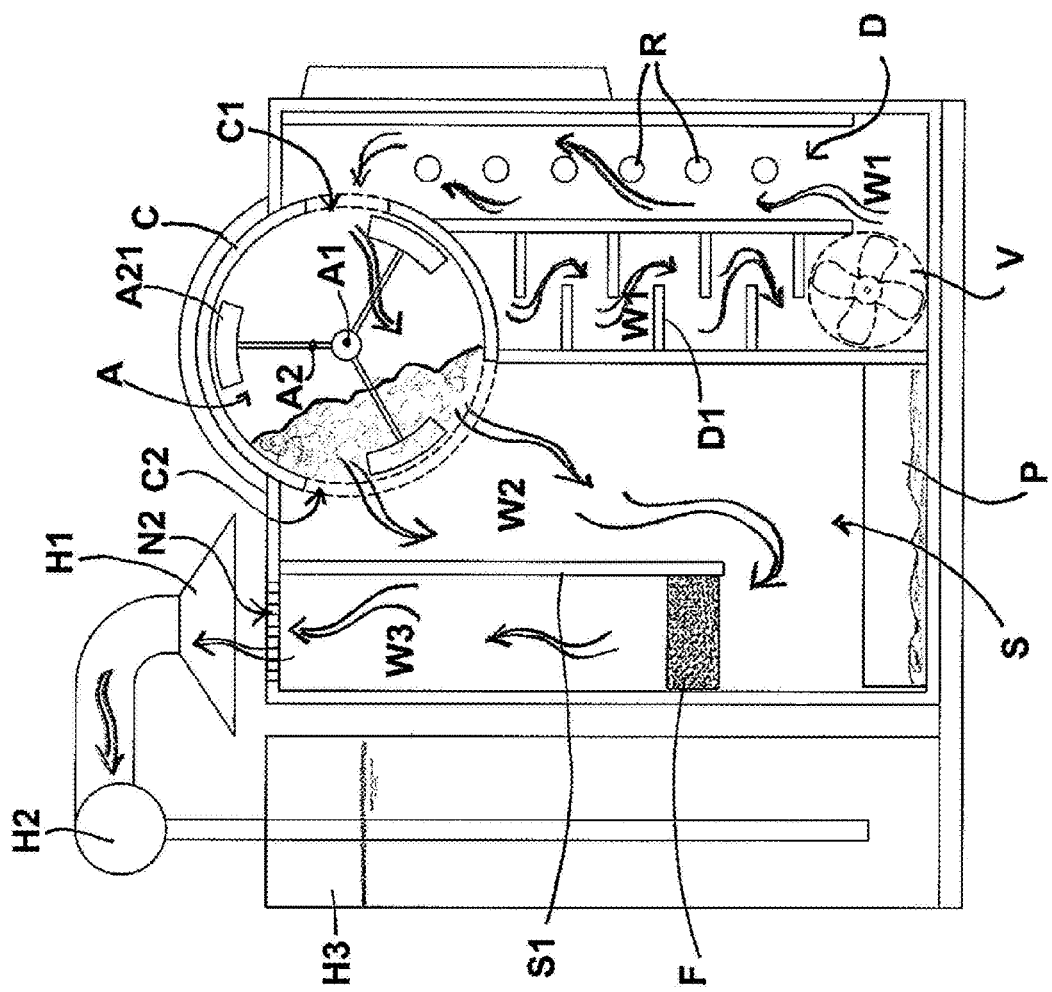
FIG. 1 shows a schematic side view of roasting equipment according to an embodiment of the invention.
Figure 2B:
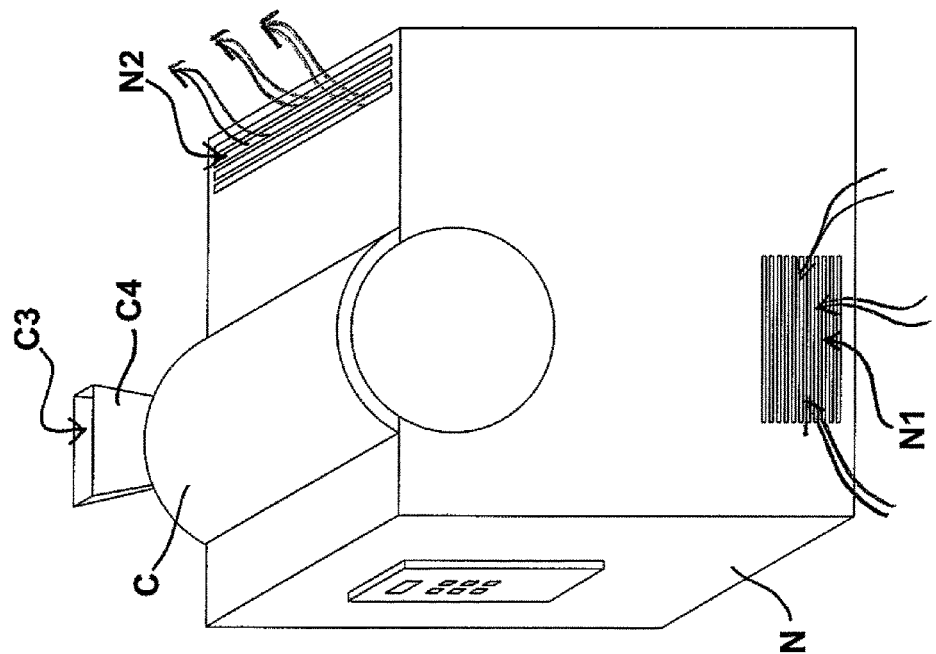
FIGS. 2a and 2b show two three-dimensional views, respectively front and back, of the case of the roasting equipment of FIG. 1.
Figure 2A:
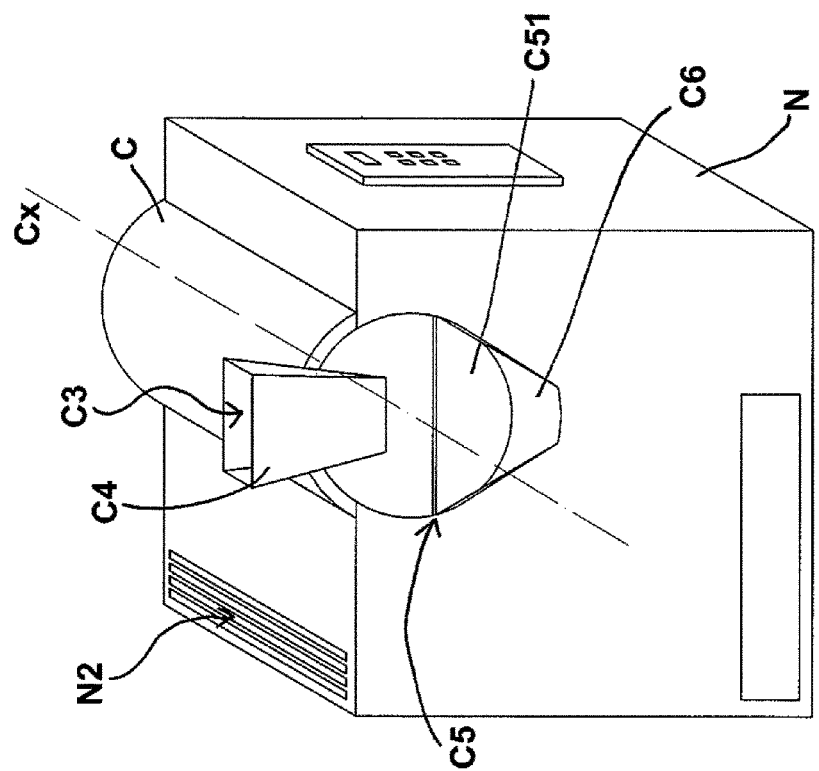

Detailed descriptions of embodiments of the invention are provided herein. It should be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Referring to the figures, roasting equipment for domestic use suitable for roasting edible seeds, in particular coffee, according to an embodiment of the invention includes a case (N) housing at least one hollow cylinder (C) containing the product to be roasted, which is arranged with a substantially horizontal longitudinal axis (Cx) and which is provided with at least one opening (C3) defined through a funnel or feed duct (C4) for introducing the product to be roasted, and with at least one additional opening (C5) for discharging the roasted product.

The illustrated equipment also includes at least one air suction fan (V) for sucking air from the outside of said case (N) through suitable intake vents (N1).

Said fan (V) conveys an air flow (W1) into said cylinder (C) through at least one delivery duct (D), and at least one resistance or heater (R) of said air flow (W1) before the air flow (W1) is introduced into said cylinder (C).

Said delivery duct (D) has preferably the shape of a U, or double U, and comprises a coil section, that is, a section with partitions (D1) arranged crosswise to the direction of said flow (W1), in order to reduce the speed of the air flow (W1) and thus optimize the heat exchange efficiency, at the same time reducing energy costs.

Said fan (V) is preferably arranged in the rear part of the case (N) of the equipment, where the intake vents (N1) are located.

Said resistance or heater (R) is preferably arranged within the delivery duct (D) that is rossed by the air flow (W1) that enters said cylinder (C).

In particular, the inlet (C1) within said delivery duct (D) that is suited to convey the hot air flow (W) into said cylinder is positioned on the side wall of said cylinder, in a preferably lateral position, so that the air flow (W1) enters the cylinder (C) in a substantially horizontal direction, orthogonally to the longitudinal axis (Cx) of the cylinder (C), and successively is distributed within the cylinder.

Moreover, the side wall of said cylinder (C) is provided with one or more holes or openings (C2) preferably arranged in a position substantially opposite said inlet (C1) of said delivery duct (D) and/or on the lower part of the cylinder (C), such that said holes or openings (C2) place the inside of said cylinder (C) in communication with at least one discharge, cooling and filtering chamber (S) arranged immediately downstream.

The hot air flow (W1) passes through said cylinder (C) substantially crosswise to the longitudinal axis (Cx) of the cylinder (C), drying and roasting the product contained therein, and then the air, filled with humidity and dust (W2), flows out through said holes (C2) and enters said discharge chamber (S).

Said chamber (S) comprises one or more baffle elements (S1) suited to convey said humid and hot air flow (W2) along a trajectory, for example U or coil-shaped, that favors the abatement of the dust and its accumulation into a removable tank (P), and then through at least one filtering element (F) configured to trap impurities and bad smells.

The flow of at least partially filtered air (W3) then ends into the external environment passing through outlet vents (N2) located on said case (N).

According to the invention, said flow (W3) exiting from said case (N) can be further filtered, for example by means of an extraction hood (H1) connected to a fan (H2) that conveys said flow (W3) into a further filtering device (H3), for example a water filter.

The hollow cylinder (C) is fixed and houses at least one device (A) for stirring the product contained in said cylinder (C), said device (A) comprising a rotary shaft (A1) arranged in a position preferably coaxial to said cylinder (C) and integral with one or more radial arms (A2) provided with product mixing and stirring blades (A21).

In particular, said shaft (A1) and said arms (A2) rotate in such a direction as to stir the product during roasting and at the same time allow the accumulation of the product on the cylinder wall that is opposite to the inlet (C1) of said delivery duct for the introduction of the air flow (W) into the cylinder (C).

With this design, the exchange surface between the coffee beans and the air flow is maximized.

Said blades (A2), furthermore, are preferably partially oriented towards said discharge opening (C5), in such a way as to mix and at the same time move the roasted product towards said discharge opening (C5), at the level of which there are a door (C51) and a chute (C6).

Figure 3A:
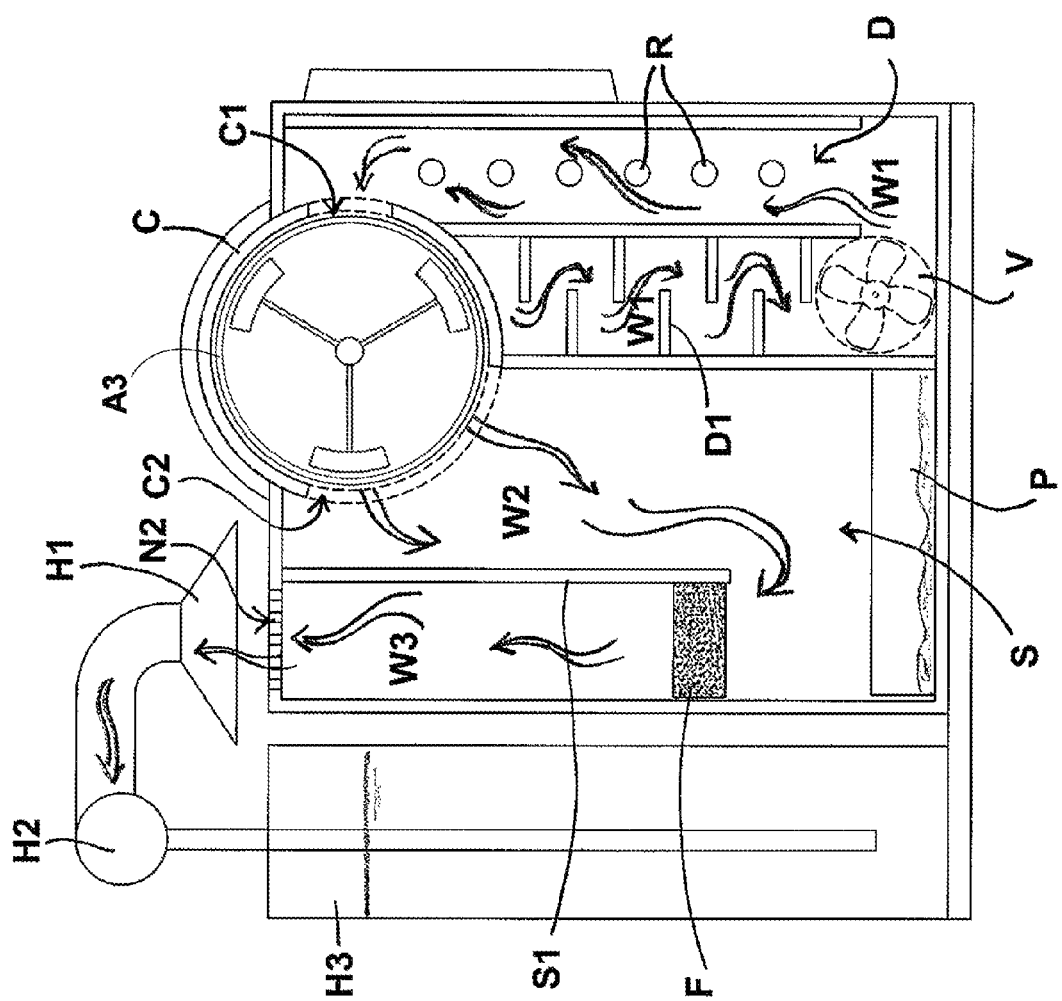
FIGS. 3a and 3b show roasting equipment according to different embodiments of the invention.
Figure 3B:
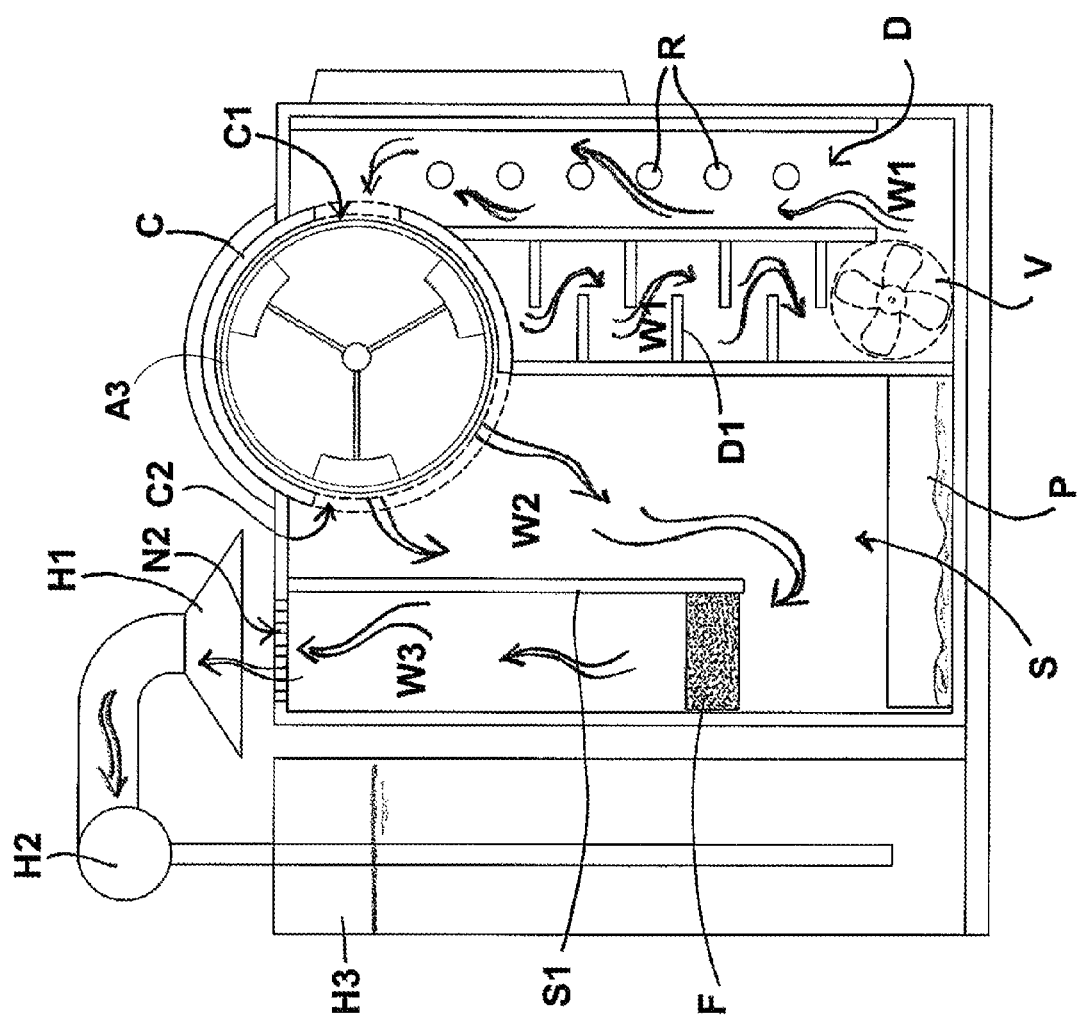

In one embodiment of the invention, the new equipment may also comprise a hollow cylindrical drum A3, which is coaxially housed in the containing cylinder (C), said drum being configured to contain the coffee beans to be roasted and to rotate in relation to said containing cylinder (C), integrally (FIG. 3b) or (FIG. 3a) not with the rotary stirring arms (A2).

While the invention has been described in connection with a number of embodiments, it is not intended to limit the scope of the invention to the particular forms set forth, but on the contrary, it is intended to cover such alternatives, modifications, and equivalents as may be included within the scope of the invention.

With reference to the above description and to the attached drawings, the following claims are expressed.

The invention claimed is:

1. Equipment for roasting edible seeds comprising:
   a housing containing:
      a drum receiving a product to be roasted, the drum having at least one feed opening for introducing the product, and at least one discharge opening for unloading the product after the roasting, the drum being in a fixed position;

an air suction fan conveying an air flow into the drum;

at least one delivery duct fluidly conveying the air flow from the air suction fan to the drum, the delivery duct comprising a U-shaped portion having a first section with at least one resistance or heater to heat the air flow before introduction into the drum, and a second section having partitions arranged cross-wise to the air flow to reduce speed of the air flow and optimize heat exchange efficiency with discharged air; and at least one device housed within the drum to move the product, the at least one device comprising at least one rotary shaft having one or more substantially radial arms or blades stirring the product during the roasting, wherein the drum is substantially cylindrical in shape and has a longitudinal axis, and wherein the drum has at least one inlet hole for the introduction of the air flow, the at least one inlet hole being provided in a lateral position on a surface of the drum, and further has one or more outlet holes for an outflow of the air flow, the one or more outlet holes being provided on the surface of the drum in a lateral position opposite to the at least one inlet hole and/or on a lower lateral portion of the surface of the drum, such that the air flow flows into the drum in a direction substantially orthogonal to the longitudinal axis and further flows out of the drum in a direction that is substantially perpendicular to the longitudinal axis and/or that is oriented downward.

2. The equipment of claim 1, further comprising a hollow drum housed in the drum in a substantially coaxial position, the hollow drum being configured to contain the edible seeds to be roasted and to rotate in relation to the drum.

3. The equipment of claim 2, wherein the hollow drum is cylindrical.

4. The equipment of claim 2, wherein the hollow drum is integral with the arms or blades during rotation.

5. The equipment of claim 2, wherein the hollow drum is not integral with the arms or blades during rotation.

6. The equipment of claim 1, wherein the rotary shaft is positioned coaxially with the drum and rotates in a direction causing the product to accumulate on a portion of a wall of the drum that is opposite to the at least one inlet hole.

7. The equipment of claim 6, further comprising at least one outflow duct or chamber, into which the air flow flowing out of the drum through the one or more outlet holes is conveyed, and at least one element filtering the air flow before flowing out of the equipment.

8. The equipment of the claim 7, wherein the at least one outflow duct or chamber comprises one or more deflectors that convey the air flow along a coil- or U-shaped trajectory, causing dust transported by the air flow to fall down.

9. The equipment of claim 1, further comprising at least one hood or device for sucking the air flow flowing out of said equipment, the at least one hood or device being configured to convey the air flow into at least one filtering device.

10. The equipment of claim 9, wherein the filtering device is a water filter.

11. The equipment of claim 1, wherein the arms or blades are arranged in a substantially radial configuration and are directed toward the at least one discharge opening to move the roasted product toward the at least one discharge opening.

12. The equipment of claim 1, wherein the at least one feed opening is connected to at least one funnel or feed duct, and wherein the at least one discharge opening is connected to at least one openable panel closing the at least one discharge opening and/or to at least one discharge chute.

13. The equipment of claim 12, wherein the at least one panel is hinged.

14. The equipment of claim 1, wherein the edible seeds are coffee beans.

* * * * *